Dec. 7, 1954 G. R. HARRINGTON 2,696,090
POWER TAKE-OFF SHAFT ASSEMBLY FOR TRACTORS AND THE LIKE
Filed June 29, 1951
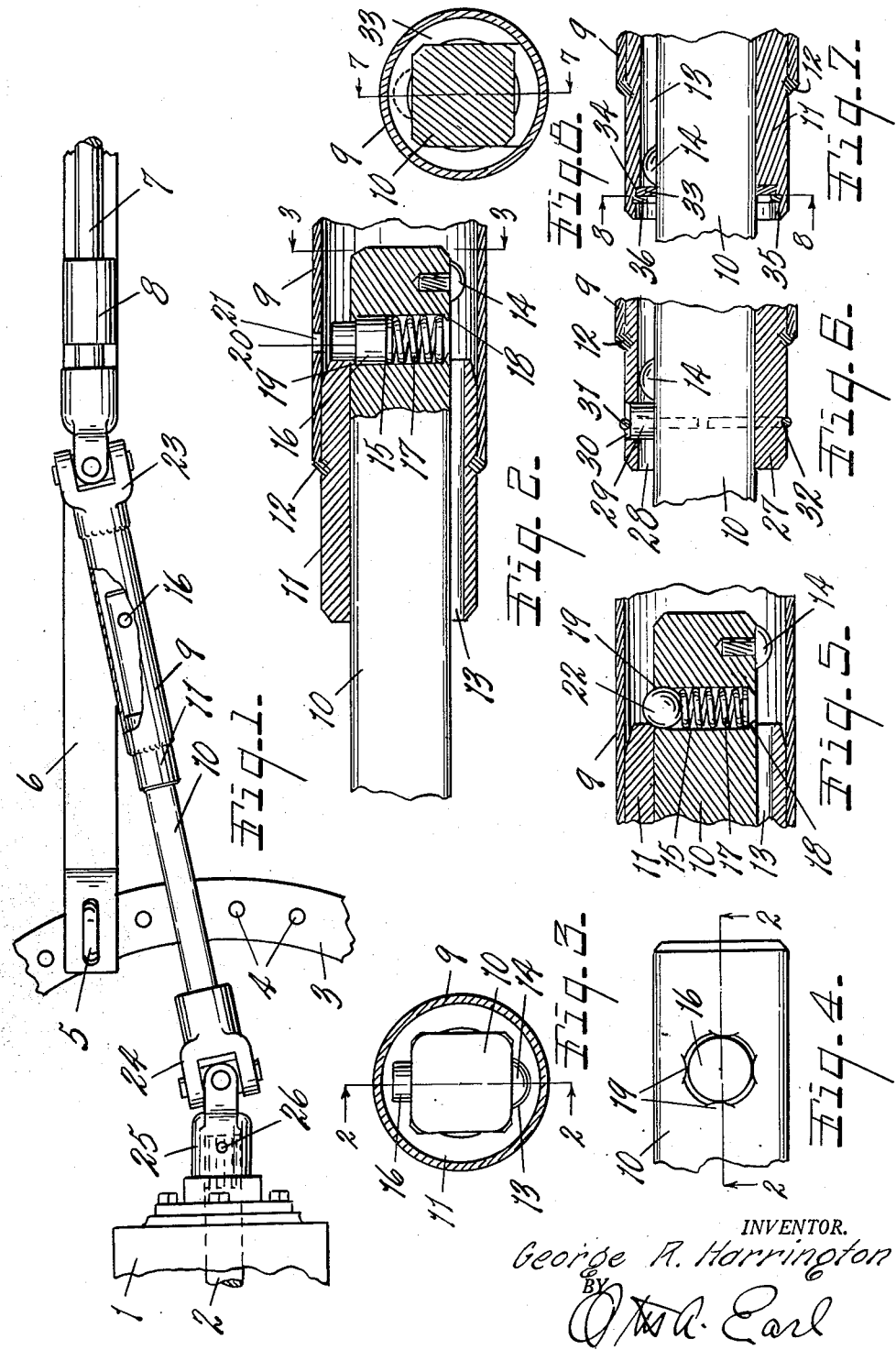
INVENTOR.
George R. Harrington
BY
Otis A. Earl
Attorney.

United States Patent Office 2,696,090
Patented Dec. 7, 1954

2,696,090

POWER TAKE-OFF SHAFT ASSEMBLY FOR TRACTORS AND THE LIKE

George R. Harrington, Kalamazoo, Mich., assignor to Blood Brothers Machine Company, Allegan, Mich.

Application June 29, 1951, Serial No. 234,343

6 Claims. (Cl. 64—23)

This invention relates to improvements in power take-off shaft assemblies for tractors and the like.

The main objects of this invention are:

First, to provide a power take-off shaft assembly for tractors which permits ready uncoupling from the driving shaft of the tractor without otherwise disassembling the driving connections.

Second, to provide a coupling shaft assembly for the power or driving shaft of a tractor and the driven shaft of a propelled machine which includes telescoping sections, the sections being retainingly secured together for normal manipulation in coupling and uncoupling the driven shaft of the propelled machine with the power or driving shaft of the tractor and at the same time permitting separation of the coupling shaft sections, should that be required or desirable.

Third, to provide a structure having these advantages which is simple and economical in its parts and the parts easily assembled.

Objects relating to details and economies of the invention will appear from the description to follow. The invention is defined and pointed out in the claims.

Fig. 1 is a fragmentary plan view of a structure embodying my invention, only such parts of a tractor and propelled vehicle being illustrated as are deemed desirable to the illustration of an adaptation of my invention.

Fig. 2 is an enlarged fragmentary view mainly in longitudinal section of a line corresponding to line 2—2 of Figs. 3 and 4.

Fig. 3 is a transverse section on a line corresponding to line 3—3 of Fig. 2.

Fig. 4 is a fragmentary top view of the inner coupling shaft section.

Fig. 5 is a fragmentary longitudinal section of a modified form or embodiment of my invention, the view corresponding to that of Fig. 2.

Fig. 6 is a fragmentary view partially in longitudinal section of another modified form or embodiment of my invention.

Fig. 7 is a fragmentary view partially in longitudinal section of a third modification or embodiment of my invention, the section being on a line corresponding to line 7—7 of Fig. 8.

Fig. 8 is a transverse section on a line corresponding to line 8—8 of Fig. 7.

The accompanying drawing 1 represents a portion of tractor, 2 the driving on power take-off shaft, and 3 representing the drawhead of the tractor which is commonly segmental in shape and provided with a plurality of spaced holes 4 adapted to receive the bolt of a clevis 5 for attaching the draw-bar 6 of the propelled machine to the drawhead. The purpose of the series of the holes in the drawhead is to permit the drawbar 6 being attached to the tractor in the desired position for the particular machine or work. 7 represents the driven shaft of the propelled and driven machine, this being in the structure illustrated supportingly mounted at 8 on the drawbar 6.

It will be understood that in use the tractor and propelled machine vary greatly in their movements to each other and that the driving and driven shaft should be coupled to permit this movement without undue strain on the driving connections. Coupling shafts for the driving and driven shafts in this general combination are old.

My invention relates primarily to an improved coupling shaft and its connection to the driving shaft. The coupling shaft of my invention comprises a tubular outer section 9 and an inner section 10 telescopingly associated with each other. The tubular outer section 9 is provided with a bearing member 11 at its inner end. This bearing member 11 having a non-circular bearing slidably receiving the noncircular section 10. The body portion of this section 9 is desirably formed of a piece of tubing. The bearing member 11 is inserted in the body portion and secured thereto by welds as indicated at 12. The bearing of the bearing member 11 is provided with a longitudinal groove 13 in one of its bearing surfaces while the inner section 10 is provided with a stud 14 which may be passed longitudinally through the groove 13 when presented in alignment therewith. This insures that the sections are assembled in their proper relation as the section 10 cannot be telescoped with the section 9 unless the stud 14 is aligned with the groove 13.

In the preferred embodiment shown in Figs. 1 to 4 inclusive the section 10 is provided with a transverse bore 15 which receives the shouldered stop 16 and the coil spring 17 which acts to bias the stop. The spring is retained by the up-sets or stakes 18 while the stop is retained by the up-sets or stakes 19 which engage the shoulder 20 of the stop. The stop when projected coacts with the inner end of the bearing member 11 preventing the withdrawal of the section 10 from the section 9. When it is desired to disassemble the coupling shaft sections the stop 16 is aligned with the hole 21 in the section 9 so that a tool can be inserted to depress the stop 16 and permit the separation of the sections.

In the embodiment shown in Fig. 5 the stop 22 is in the form of a ball. The sections in this embodiment are normally retained in working telescoping relation. However they can be separated by a pull sufficient to depress the ball stop 22.

Section 9 is provided with a universal joint 23 connected to the driven shaft 7 while the section 10 is provided with a universal joint 24 connection to the driving shaft. The member 25 of this universal joint 24 is adapted to be sleeved on the driving shaft and detachably retained thereon by the pin 26. When the joint member 25 is detached from the driving shaft the coupling shaft drops upon and is supported by the drawhead 3. This affords a very quick means for connecting the driven shaft with the driving shaft and when the coupling shaft is disconnected from the driving shaft it is supported so that it is not likely to be injured.

In the embodiment shown in Fig. 6 the bearing member 27 corresponds to bearing member 11 of the preferred embodiment. In this embodiment the longitudinal groove 28 is formed in the top surface of the bearing member, and stud 14 also serves as a stop member coacting with the stop 29 disposed in a hole 30 in the bearing member 27. The stop 29 is removably retained by the snap ring 31 engaged in a groove 32 so that it crosses the stop 29. By removing the ring 31 the stop 29 can be removed thereby permitting separation of the coupling shaft sections.

In the embodiment shown in Figs. 8 and 9 the stud 14 serves as a stop member coacting with the stop 33 which is seated in an internal recess 34 provided therefore with the outer end of the bearing member 11. The annular internal groove 35 is designed to receive the snap ring 36 which retains the stop 33 while permitting its removal. Stop 33 is of general U shape and embraces the inner shaft section as is shown in Fig. 8. With this arrangement coupling shaft sections are retained in assembled relation but may be disassembled should occasion require.

I have illustrated and described my invention in a highly practical embodiment thereof. I have not attempted to illustrate various adaptations for different tractors or machines to be propelled and driven in power take-off of the tractor as it is believed that those skilled in the art to embody or adapt my invention as may be desired.

Having thus described my invention, what I claim as new and desire to secure by Letters Patent is:

1. A takeoff shaft assembly for tractors including a driving shaft and a drawhead provided with means permitting the attachment of a drawbar of a propelled machine in selected angularly spaced positions relative to the axis of the driving shaft, the drawbar of the propelled machine having a driven shaft supportedly associated therewith, a coupling shaft for the said driving and driven shafts comprising telescopingly associated sections, one section being tubular and having a bearing member at the inner end thereof and provided with a non-circular bearing having a longitudinal groove in one inner surface thereof, the other shaft section being of noncircular cross section and telescopically slidable within said bearing member and projecting beyond the inner end thereof, said noncircular section having a transverse bore therein constituting a stop socket, a stop disposed in said bore to project therefrom to coact with the inner end of said bearing member, and a spring disposed in said bore and acting to bias said stop to projected position, said tubular section having an opening aligned with said stop when the sections are in fully extended positions, said noncircular section being provided with a stud which is passable through said bearing member when aligned with the groove therein, one of said coupling shaft sections being provided with a universal joint detachably engageable with said driving shaft and the other with a universal joint connection with said driven shaft.

2. A takeoff shaft assembly for tractors including a driving shaft and a propelled machine including a driven shaft, a coupling shaft for the said driving and driven shafts comprising telescopingly associated sections, one section being tubular and having an internally noncircular slide bearing member at the inner end thereof having a longitudinal groove in one inner surface thereof, the other shaft section being of noncircular cross section and telescopically slidable within said bearing member, and a spring biased stop on the inner of said sections coacting with said bearing member, said tubular section having an opening with which said stop is alignable, said noncircular section being provided with a stud which is passable through said bearing member when aligned with the groove therein, one of said coupling shaft sections being provided with a universal joint detachably engageable with said driving shaft and the other with a universal joint connection to said driven shaft.

3. A takeoff shaft assembly for tractors including a driving shaft and a propelled machine including a driven shaft, a coupling shaft for the said driving and driven shafts comprising telescopingly associated sections, one section being tubular and having a slide bearing member at the outer end thereof provided with a noncircular bearing having a longitudinal groove in one inner surface thereof, the other shaft section being of noncircular cross section and telescopically slidable within said bearing member, and coacting stops on said sections normally preventing the separation thereof, said noncircular section being provided with a stud which is passable through said bearing member when aligned with the groove therein, of said coupling shaft sections being provided with a universal joints at their outer ends.

4. A coupling shaft for driving and driven shafts comprising telescopically associated sections, one of which is tubular and provided with a bearing member at the outer end thereof having a noncircular bearing and a longitudinal groove in one of its inner surfaces and extending from end to end thereof, the other sections being of noncircular cross section and telescopically slidable within said bearing member and projecting beyond the inner end thereof, said noncircular section having a transverse bore therein constituting a stop socket, a shouldered stop disposed in said bore, and a spring disposed in said bore and acting to bias said stop to projected position, the walls of the bore being staked at the ends thereof to retain said spring and to retainingly coact with said shoulder of said stop, said tubular section having an opening therein alignable with said stop to facilitate the disengagement of the stop and permit the disassembly of the sections, the noncircular section being provided with a stud passable through said bearing member when aligned with the groove therein.

5. A coupling shaft assembly for connecting a power shaft of a tractor with the driven shaft of a propelled machine comprising telescopingly associated inner and outer shaft sections, the outer section having a slide bearing portion at its outer end with a longitudinal groove in one inner surface thereof, the inner section being of noncircular cross section and telescopically slidable within the outer section and having a stud passable through the bearing portion of said outer section when aligned with the groove thereof, and a spring biased stop on said inner section, said outer section having a stop coacting with the spring biased stop and having an opening with which said stop is alignable to facilitate the disengagement of the stop with the coacting stop carried by said outer section.

6. A coupling shaft assembly for connecting a power shaft of a tractor with the driven shaft of a propelled machine comprising telescopingly associated inner and outer shaft sections, the outer section having a slide bearing portion at its outer end with a longitudinal groove in one inner surface thereof, the inner section being of noncircular cross section and telescopically slidable within the outer section and having a stud passable through the bearing portion of said outer section when aligned with the groove thereof, a spring biased stop on said inner section, and a stop on the outer section engageable with the spring biased stop to prevent the sections from being disconnected from each other.

References Cited in the file of this patent

UNITED STATES PATENTS

| Number | Name | Date |
|---|---|---|
| 73,914 | Moul | Jan. 28, 1868 |
| 1,953,063 | Coultas | Apr. 3, 1934 |
| 2,329,601 | Frye | Sept. 14, 1943 |
| 2,441,265 | Frye | May 11, 1948 |
| 2,567,127 | Shoffner | Sept. 4, 1951 |
| 2,614,405 | Clausen | Oct. 21, 1952 |